(12) United States Patent
Kuo et al.

(10) Patent No.: US 6,961,570 B2
(45) Date of Patent: Nov. 1, 2005

(54) HANDLING OF A WIRELESS DEVICE RE-ENTERING A SERVICE AREA

(75) Inventors: Richard Lee-Chee Kuo, Hsin-Chu (TW); Rex Huan-Yueh Chen, Chi-Lung (TW)

(73) Assignee: ASUSTeK Computer Inc., Taipei (TW)

( * ) Notice: Subject to any disclaimer, the term of this patent is extended or adjusted under 35 U.S.C. 154(b) by 450 days.

(21) Appl. No.: 10/064,463

(22) Filed: Jul. 17, 2002

(65) Prior Publication Data

US 2004/0203778 A1 Oct. 14, 2004

(51) Int. Cl.⁷ .................................................. H04Q 7/20
(52) U.S. Cl. ................. 455/436; 455/435.1; 455/432.1; 455/452.1; 370/322; 370/329
(58) Field of Search .......................... 455/435.1, 435.2, 455/452.1, 458, 510, 432.1, 436; 370/322, 329, 348, 350

(56) References Cited

U.S. PATENT DOCUMENTS

| | | | | |
|---|---|---|---|---|
| 5,745,695 A | * | 4/1998 | Gilchrist et al. | 709/227 |
| 5,884,196 A | * | 3/1999 | Lekven et al. | 455/574 |
| 6,243,579 B1 | * | 6/2001 | Kari | 455/426.1 |
| 6,493,552 B1 | * | 12/2002 | Hicks | 455/435.2 |
| 6,529,497 B1 | * | 3/2003 | Hjelm et al. | 370/347 |
| 2002/0107025 A1 | * | 8/2002 | Oliveira | 455/452 |
| 2002/0160812 A1 | * | 10/2002 | Moshiri-Tafreshi et al. | 455/661 |

OTHER PUBLICATIONS

ETSI TS 125 331 V3.10.0; Universal Mobile Telecommunications System (UMTS); Radio Ressource Control (RRC) protocol specification (3GPP TS 25.331 version 3.10.0 Release 1999): Mar. 2002; pp. 36–38, 199–203, 688–689; XP–002254287.

Holma H et al; WCDMA for UMTS; Radio Access for Third Generation Mobile Communications; 2001; pp. 135–151; XP–002254288.

3 GPP TS 25.331 V3.10.0 (Mar. 2003) 3rd Generation Partnership Project; Technical Specification Group Radio Access Network; Radio Resource Control (PRG); Protocol Specification (Release 1999).

3 GPP TS 25.322 V3.10.0 (Mar. 2002) 3rd Generation Partnership Project; Technical Specification Group Radio Access Network Radio Link Control (RLC) Protocol Specification (Release 1999).

3GPP TS 25.331 V3.10.0 (Mar. 2003); 3rd Generation Partnership project; Technical Specification Group Radio Access Network; Radio Resource Control (RRC); Protocol Specification (Release 1999).

* cited by examiner

Primary Examiner—Stephen D'Agosta
(74) Attorney, Agent, or Firm—Winston Hsu

(57) ABSTRACT

A mobile unit, or UE (User Equipment) includes a Radio Resource Control (RRC) and a plurality of unique states defining the connectivity between the UE and a base station. Once a RRC indicates that it is "Out of Service", a series of timers are started to limit the duration of attempts by the RRC to re-enter an "In Service" condition before the RRC releases allocated resources and moves to an Idle Mode. In certain circumstances, it is necessary to stop one or more of these timers to prevent inadvertently severing the connection.

7 Claims, 5 Drawing Sheets

HANDLING OF A WIRELESS DEVICE RE-ENTERING A SERVICE AREA

BACKGROUND OF INVENTION

1. Field of the Invention

The present invention relates to a wireless communications network. In particular, the present invention discloses a method for a mobile unit, often known as a UE (User Equipment), to re-enter a 3GPP service area.

2. Description of the Prior Art

Please refer to FIG. 1. FIG. 1 is a simple block diagram of a wireless communications network 10, as defined by the $3^{rd}$ Generation Partnership Project (3GPP) specifications 3GPP TS 25.322 V3.10.0 "RLC Protocol Specification", and 3GPP TS 25.331 V3.10.0 "Radio Resource Control (RRC) Specification", which are included herein by reference. The wireless communications network 10 comprises a plurality of radio network subsystems (RNSs) 20 in communications with a core network (CN) 30. The plurality of RNSs 20 is termed a Universal Mobile Telecommunications System (UMTS) Terrestrial Radio Access Network, or UTRAN for short. Each RNS 20 comprises one radio network controller (RNC) 22 that is in communications with a plurality of Node Bs 24. Each Node B 24 is a transceiver, which is adapted to send and receive wireless signals, and which defines a cell region. A plurality of Node Bs 24 defines a UTRAN Registration Area (URA). The wireless communications network 10 assigns a mobile unit 40 (generally termed a "UE" for User Equipment) to a particular RNS 20, which is then termed the serving RNS (SRNS) 20s of the UE 40.

Data destined for the UE 40 is sent by the CN 30 (or UTRAN 20u) to the SRNS 20s. It is convenient to think of this data as being sent in the form of one or more packets that have a specific data structure, and which travel along one of a plurality of radio bearers (RBs) 28, 48. An RB 28 established on the SRNS 20s will have a corresponding RB 48 established on the UE 40. The RBs 28, 48 are numbered consecutively, from RB0 to RBn. Typically, RB0 to RB4 are dedicated signaling RBs (SRBs), which are used for passing protocol signals between the UTRAN 20u and the UE 40. RBs 28, 48 greater than four (i.e., RB5, RB6, etc.) are typically used to carry user data.

The RNC 22 utilizes a Node B 24, which is assigned to the UE 40 by way of a Cell Update procedure, to transmit data to, and receive data from, the UE 40. The Cell Update procedure is initiated by the UE 40 to change a cell as defined by a Node B 24, and even to change a URA. Selection of a new cell region will depend, for example, upon the location of the UE 40 within the domain of the SRNS 20s. The UE 40 broadcasts data to the wireless communications network 10, which is then picked up by the SRNS 20s and forwarded to the CN 30. Occasionally, the UE 40 may move close to the domain of another RNS 20, which is termed a drift RNS (DRNS) 20d. A Node B 24 of the DRNS 20d may pick up the signal transmitted by the UE 40. The RNC 22 of the DRNS 20d forwards the received signal to the SRNS 20s. The SRNS 20s uses this forwarded signal from the DRNS 20d, plus the corresponding signals from its own Node B 24 to generate a combined signal that is then decoded and finally processed into packet data. The SRNS 20s then forwards the received data to the CN 30. Consequently, all communications between the UE 40 and the CN 30 must pass through the SRNS 20s.

Please refer to FIG. 2 in conjunction with FIG. 1. FIG. 2 is a simple block diagram of a UMTS radio interface protocol architecture, as used by the communications network 10. Communications between the UE 40 and the UTRAN 20u is effected through a multi-layered communications protocol that includes a layer 1, a layer 2 and a layer 3, which together provide transport for a signaling plane (C-plane) 92 and a user plane (U-plane) 94. Layer 1 is the physical layer 60, and in the UTRAN 20u is responsible for combining signals received from the DRNS 20d and SRNS 20s. Layer 2 includes a packet data convergence protocol (PDCP) layer 70, a Radio Link Control (RLC) layer 72, and a Medium Access Control (MAC) layer 74. Layer 3 includes a Radio Resource Control (RRC) layer 80. The U-plane 94 handles user data transport between the UE 40 and the UTRAN 20u, whereas the C-plane 92 handles transport for signaling data between the UE 40 and the UTRAN 20u. The RRC 80 sets up and configures all RBs 28, 48 between the UTRAN 20u and the UE 40. The PDCP layer 22 provides header compression for Service Data Units (SDUs) received from the U-plane 94. The RLC layer 72 provides segmentation of PDCP 70 SDUs and RRC 80 SDUs into RLC protocol data units (PDUs), and under acknowledged mode (AM) transfers, can provide upper layers (such as the PDCP layer 70 or the RRC layer 80) with a confirmation that RLC PDUs have been successfully transmitted and received between the UTRAN 20u and the UE 40. The MAC layer 74 provides scheduling and multiplexing of RLC PDUs onto the transport channel, interfacing with the physical layer 60.

It is the RRC layer 80 that is responsible for the establishment and configuring of the RBs 28, 48. The RRC layer 80 has various operational states that affect how the RRC layer 80 behaves. Please refer to FIG. 3 with reference to FIG. 1 and FIG. 2. FIG. 3 is a state diagram of the RRC layer 80. The RRC layer 80 has two primary states: an Idle Mode 81 and a UTRA RRC Connected Mode 86. While in Idle Mode 81, the RRC layer 80 has no lines of communication open with its peer RRC layer 80, except perhaps along RB0, which is a common channel. That is, there are no available SRBs 28, 48 that enable communications between peer entity RRC layers 80.

Utilizing the UE 40 as an example platform, once the RRC layer 80 of the UE 40 establishes a connection (i.e., an SRB 28, 48) with its peer RRC layer 80 on the UTRAN 20u, the RRC layer 80 of the UE 40 switches into the UTRA RRC Connected Mode 86. This connection is typically initiated along RB0, which is a shared channel. Internally, the UTRA RRC Connected Mode 86 has four unique states: CELL_DCH 82, CELL_FACH 83, CELL_PCH 84 and URA_PCH 85. In the CELL_DCH state 82, a dedicated channel is allocated to the UE 40 for uplink (UE 40 to UTRAN 20u) and downlink (UTRAN 20u to UE 40) communications. In the CELL_FACH state 83, no dedicated channel is allocated to the UE 40, but instead the UE 40 is assigned a default common or shared transport channel for uplink and downlink. In the CELL_PCH state 84, no dedicated physical channel is allocated to the UE 40, no uplink activity is possible for the UE 40, and the position of the UE 40 is known by the UTRAN 20u on a cell level (i.e., a node B basis 24). In the URA_PCH state 85, no dedicated physical channel is allocated to the UE 40, no uplink activity is possible for the UE 40, and the position of the UE 40 is known by the UTRAN 20u on a URA basis.

A number of reconfiguration procedures are available to the RRC layer 80 to setup and configure RBs 28, 48. These procedures involve the UTRAN 20u sending a specific message to the UE 40 along an RB 28, 48, and the UE 40 responding in turn with a corresponding message. Typically, the message is sent along RB2, which is an SRB. The messages include Radio Bearer Setup, Radio Bearer Reconfiguration, Radio Bearer Release, Transport Channel Reconfiguration, and Physical Channel Reconfiguration. For each of these reconfiguration messages, the UE 40 has a corresponding "Complete" or "Failure" response message indicating success or failure of the procedure on the UE 40 side, and which may provide the UTRAN 20*u* any necessary information for the UTRAN 20*u* to complete the procedure. The reconfiguration message and the response message may all carry optional information elements (IEs), which are fields of data that hold ancillary information. In addition to these reconfiguration procedures, there also exists a Cell Update procedure, which originates with a Cell Update message from the UE 40 and is responded to by the UTRAN 20*u*. The Cell Update procedure is used by the UE 40 to indicate a change of cell location (i.e., Node B 24), of URA, or connection state 82, 83, 84, and 85. The UE 40 initiates a Cell Update procedure in a variety of cases; to uplink data transmitted from the UE 40 to the UTRAN 20*u*, as a paging response, due to a radio link failure, re-entering a service area, due to an RLC 72 unrecoverable error, for cell reselection, and a periodical cell update.

The UE 40 considers itself as having detected an "In Service" condition if a suitable cell (i.e., a node B 24) is found allowing normal communication with the UTRAN 20*u* and as having detected an "Out of Service" condition when a suitable cell is not found and normal communication with the UTRAN 20*u* is not possible. A series of timers are used by the UE 40 to regulate how long certain conditions are to be maintained when the UE 40 is "Out of Service". The duration for each timer is set in an IE "UE Timers and constants in connected mode" and is included in the System Information Block type 1 broadcast by the UTRAN 20*u*.

When a Cell Update procedure is initiated, the UE 40 sends a CELL UPDATE message to the UTRAN 20*u* stating the reason for the Cell Update and starting a timer T302. Then, the UE 40 waits for a CELL UPDATE CONFIRM message from the UTRAN 20*u*. If the timer T302 expires before the response from the UTRAN 20*u* is received by the UE 40, the UE 40 retransmits the CELL UPDATE message. The maximum number of times of retransmission is determined by N302, a value that is also stored in the IE "UE Timers and constants in connected mode". During the period from when the UE 40 initiates a Cell Update procedure until the Cell Update procedure ends, the UE 40 may transmit additional Cell Update messages to the UTRAN 20*u* citing different causes.

When the UE 40 is in the CELL_FACH 83, URA_PCH 85, or CELL_PCH 84 state, a periodical Cell Update procedure is performed regularly attempting to find the most suitable cell for service. A periodical Cell Update procedure will be configured if a timer T305 in the IE "UE Timers and constants in connected mode" is set to any value other than "infinity" and the timer T305 expires. The timer T305 regulates the frequency of periodical Cell Updates. If the timer T305 expires and the UE 40 detects that an "In Service" condition exists, the UE 40 will perform the Cell Update or a URA Update procedure. If the timer T305 expires and the UE 40 detects that an "Out of Service" condition exists, cell re-selection attempts are made and a timer T307 is started. The timer T307 regulates how long the UE 40 should try to select a suitable cell before entering the Idle Mode 81. If the timer T307 expires before the UE 40 re-enters an "In Service", the UE 40 releases all dedicated resources and moves to the Idle Mode 81.

If the UE 40 is in the CELL_FACH state and an "Out of Service" condition is detected, a timer T317 is started. The timer T317 also regulates how long the UE 40 should try to select a suitable cell before entering the Idle Mode 81. If the timer T317 expires and the "Out of Service" condition still exists, the UE 40 releases all dedicated resources and moves to the Idle Mode 81. If the UE 40 is in the CELL_PCH or URA_PCH state and an "Out of Service" condition is detected, a timer T316 is started. The timer T316 regulates how long the UE 40 should try to select a suitable cell before starting the timer T317 and entering the CELL_FACH state 83. If the timer T316 expires, the UE 40 starts the timer T317, moves to the CELL_FACH state 83, and continues cell re-selection. Again, if the timer T317 expires and the "Out of Service" condition still exists, the UE 40 releases all dedicated resources and moves to the Idle Mode 81.

FIG. 4 is a flowchart of the above described timers according to prior art. When an "Out of Service" condition is detected and the UE 40 is in the CELL_PCH state 84 or URA_PCH state 85, the timer T316 is started and cell reselection continues attempting to re-establish service. If the UE 40 detects an "In Service" condition before the timer T316 expires, the UE 40 stops the timer T316 (FIG. 4, item 100). However, if the UE 40 remains "Out of Service" when the timer T316 expires, the UE 40 starts the timer T317 and moves to the CELL_FACH state 83 (FIG. 4, item 105).

A problem with the prior art occurs when the UE 40 detects an "Out of Service" condition and is in the CELL_PCH state 84 or URA_PCH state 85. If the timer T305 expires, a periodical Cell Update cannot be completed because the UE 40 cannot contact the UTRAN 20*u*. Therefore, the timer T307 is started (FIG. 4, item 110). If the UE 40 remains "Out of Service" when the timer T307 expires, the UE 40 releases all allocated resources and enters the Idle Mode 81 (FIG. 4, item 115). However, if the UE 40 detects an "In Service" condition before the timer T307 expires, the UE 40 fails to stop the timer T307 and the connection is unintentionally broken when the timer T307 expires (FIG. 4, item 120).

When the UE 40 detects an "Out of Service" condition and is in the CELL_FACH state 83, the timer T317 is started and cell reselection continues attempting to re-establish service. If the UE 40 remains "Out of Service" when the timer T317 expires, the UE 40 releases all allocated resources and enters the Idle Mode 81 (FIG. 4, item 125). If the UE 40 detects an "In Service" condition and no Cell Update or URA Update procedure is ongoing, the UE 40 stops the timer T317 (FIG. 4, item 130). However, if the UE 40 detects an "In Service" condition and a Cell Update or URA Update procedure is ongoing, the UE 40 fails to stop the timer T317 and the connection is unintentionally broken when the timer T317 expires (FIG. 4, item 135).

When the UE 40 detects an "Out of Service" condition and is in the CELL_FACH state 83 and the timer T305 expires, again a periodical Cell Update cannot be completed because the UE 40 cannot contact the UTRAN 20*u*. Therefore, the timer T307 is started. If the UE 40 remains "Out of Service" when the timer T307 expires, the UE 40 releases all allocated resources and enters the Idle Mode 81 (FIG. 4, item 125). However, if the UE 40 detects an "In Service" condition before the timer T307 expires, the UE 40 fails to stop the timer T307 and the connection is unintentionally broken when the timer T307 expires (FIG. 4, item 140).

Failing to stop either the timer T307 or the timer T317 when the UE 40 detects an "In Service" condition will result in the release of all allocated resources, unintentionally breaking the connection. However, the prior art (sub-clause 8.5.5.2.2 in TS 25.331 V3.10.0) calls for only stopping the timer T316 when the UE 40 is in the CELL_PCH or URA_PCH state and re-enters the service area (FIG. 4, item 100). The timer T307 should be stopped if the timer T307 is active when service is regained.

Additionally, if the timer T316 expires before re-entering the service area, the UE 40 moves to the CELL_FACH state and starts the timer T317. The prior art (sub-clause 8.5.5.2.2 in TS 25.331 V3.10.0) calls for only stopping the timer T317 if no Cell Update or URA update procedure is ongoing when the UE 40 is in the CELL_FACH state and re-enters the service area (FIG. 4, item 130). The timer T317 should be stopped whether a Cell Update or URA procedure is ongoing or not. Similarly, if the timer T307 is running when the UE 40 re-enters the service area while in the CELL_FACH state 83, the timer T307 is not always stopped and will break the connection upon expiry of the timer T307.

SUMMARY OF INVENTION

It is therefore an objective of the claimed invention to provide a method for ensuring that a Radio Resource Control (RRC) supported by a mobile unit of a wireless communications system does not inadvertently release allocated radio bearers and move the mobile unit to an Idle Mode after the RRC switches from indicating an "Out of Service" condition to indicating an "In Service" condition.

Briefly summarized, the claimed invention discloses a method for maintaining connectivity between a mobile unit and a base station in a wireless communications system. The RRC is used to establish at least a radio bearer when the mobile unit is within a service area of the base station. The RRC is also capable of releasing allocated radio bearers, and comprises a plurality of internal states, each state defining a connective relationship between the RRC and the wireless communications system.

A first situation exists when the RRC detects an out of service condition for a previously established radio bearer and the mobile unit enters a CELL_PCH state where the mobile unit is known to the base station on a cell level or enters a URA_PCH state where the mobile unit is known to the base station on a URA level. The CELL_PCH state and the URA_PCH state both have no dedicated physical channel existing between the mobile unit and the base station and no uplink activity is possible for the mobile unit. If a first timer expires indicating a need for performing a periodical Cell Update procedure, because the RRC indicates that the mobile unit is currently "Out of Service", a second timer is started to limit the duration of time that the RRC continues attempting to re-establish a radio bearer and normal connectivity with the base station. If the second timer expires, the RRC releases allocated resources and enters an Idle Mode, breaking the connection. If the RRC detects an in service condition before the second timer expires, the claimed invention stops the second timer to avoid releasing the established radio bearer, which would otherwise break the connection.

A second situation exists when the mobile unit enters a CELL_FACH state and the RRC detects an out of service condition for a previously established radio bearer. In the CELL_FACH state, the mobile unit is known to the base station on a cell level and no dedicated channel is allocated to the mobile unit, but the mobile unit is assigned a default common or shared transport channel for uplink and downlink. Again, if a first timer expires indicating a need for performing a periodical Cell Update procedure, because the RRC indicates that the mobile unit is currently "Out of Service", a second timer is started to limit the duration of time that the RRC attempts to detect an in service condition, and thus normal connectivity with the base station. If the second timer expires, the RRC releases the allocated radio bearer and enters an Idle Mode, breaking the connection. If the second timer is active when the RRC detects an in service condition for the radio bearer and no Cell/URA Update procedure is ongoing, the claimed invention stops the second timer to avoid breaking the connection.

A third situation exists when the mobile unit enters the CELL_FACH state and the RRC detects an out of service condition. A third timer used for limiting a duration used by the RRC to detect an in service condition for the radio bearer before the RRC releases the radio bearer and enters an Idle Mode. If the RRC detects an in service condition for the radio bearer and a Cell Update procedure or a URA procedure (or both) is ongoing, the claimed invention stops the third timer to avoid breaking the connection.

It is an advantage of the claimed invention to always stop the second and third timers when the RRC re-enters an "In Service" condition from an "Out of Service" condition. By stopping the timers, the inadvertent release of allocated radio bearers by the RRC and the severing of connection between the mobile unit and the base station as a result of the release can be avoided.

These and other objectives of the claimed invention will no doubt become obvious to those of ordinary skill in the art after reading the following detailed description of the preferred embodiment, which is illustrated in the various figures and drawings.

DETAILED DESCRIPTION

In the following description, user equipment (UE) may be a mobile telephone, a handheld transceiver, a personal data assistant (PDA), a computer, or any other device that requires a wireless exchange of data. It is assumed that this wireless exchange of data conforms to 3GPP-specified protocols. It should be understood that many means may be used for the physical layer to effect wireless transmissions, and that any such means may be used for the system hereinafter disclosed.

Figure 1:
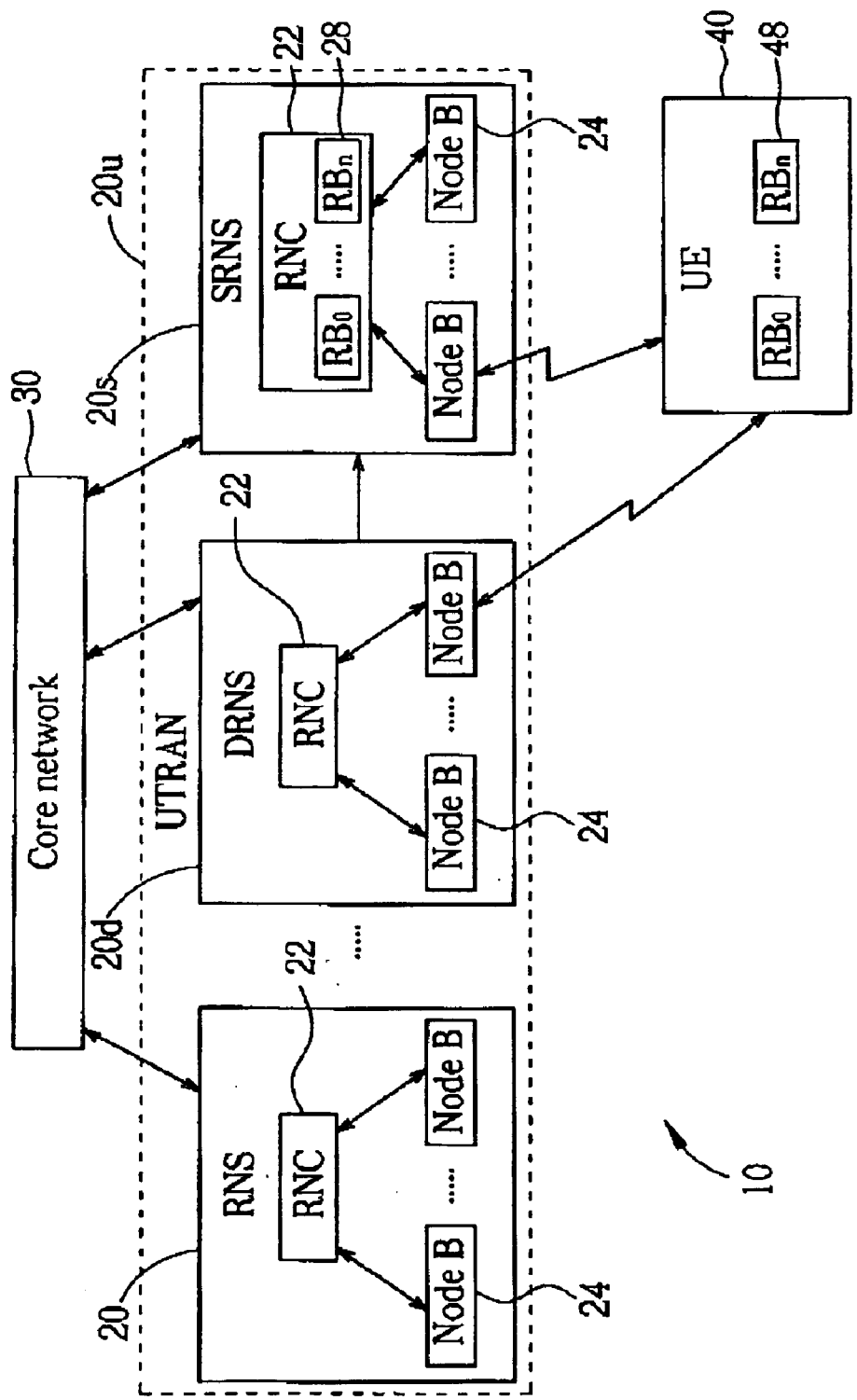
FIG. 1 is a block diagram of a wireless communications system.
Figure 2:
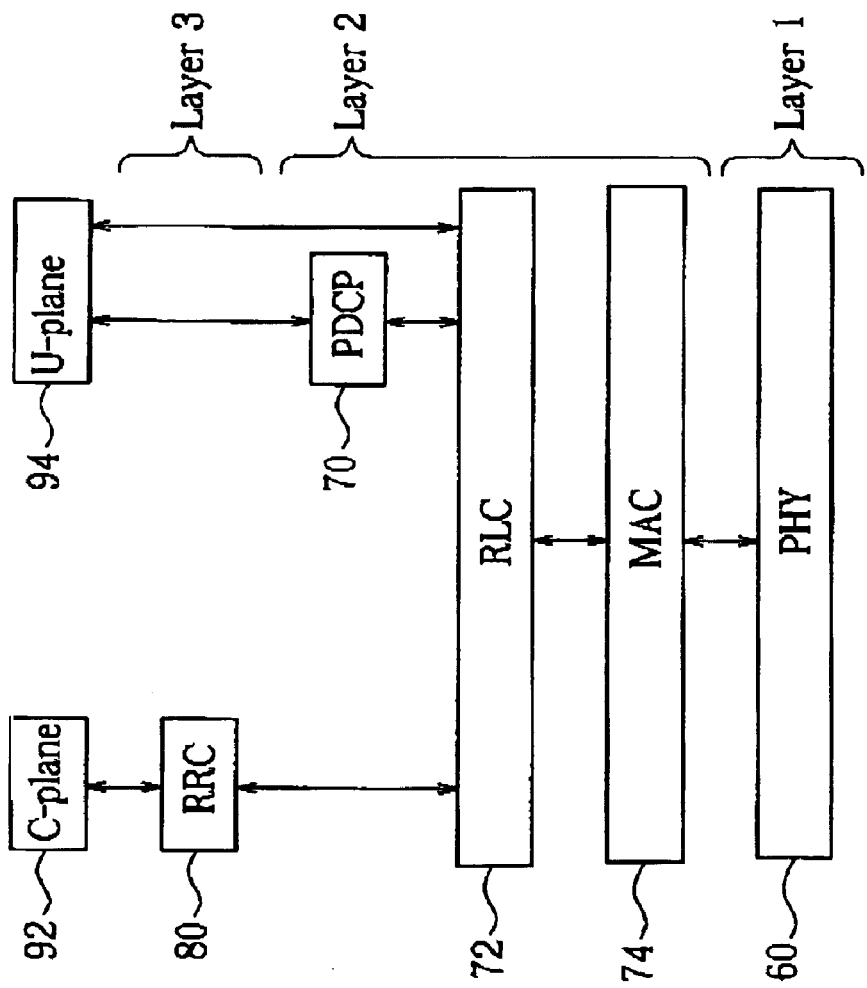
FIG. 2 is a simple block diagram of a UMTS radio interface protocol architecture of the wireless communications system of FIG. 1.
Figure 3:
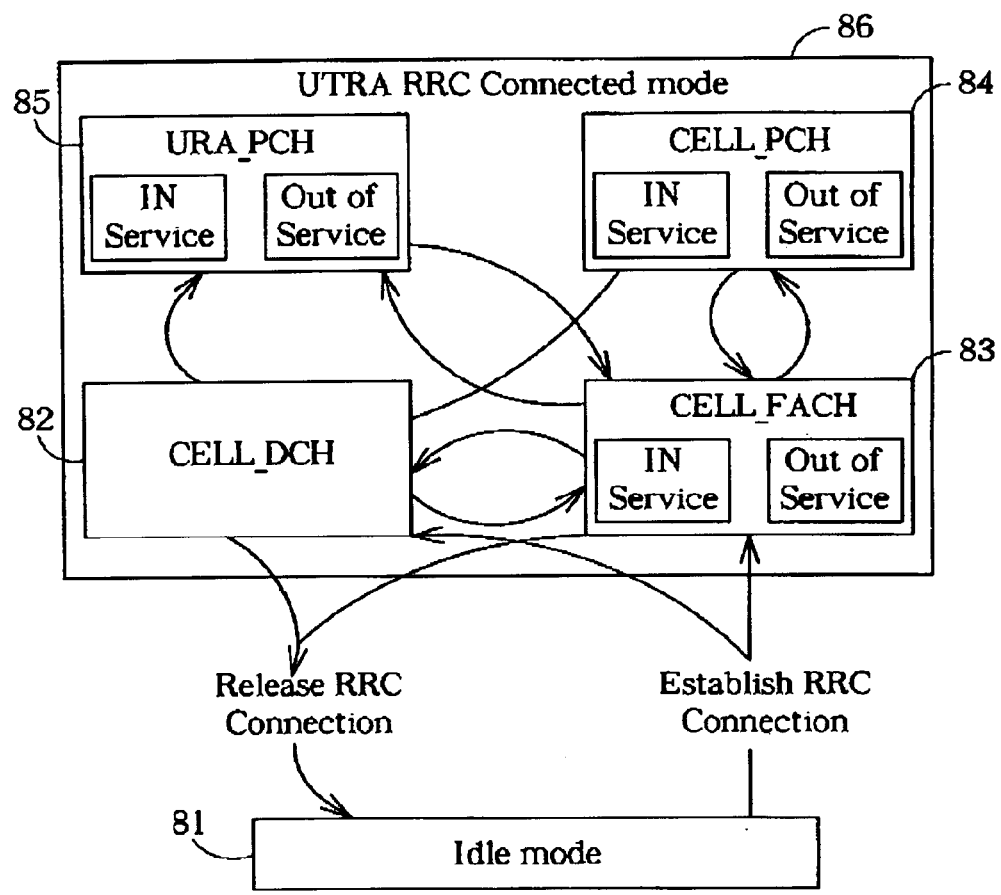
FIG. 3 is a state diagram of the RRC layer of a UMTS radio interface protocol architecture of FIG. 2.
Figure 4:
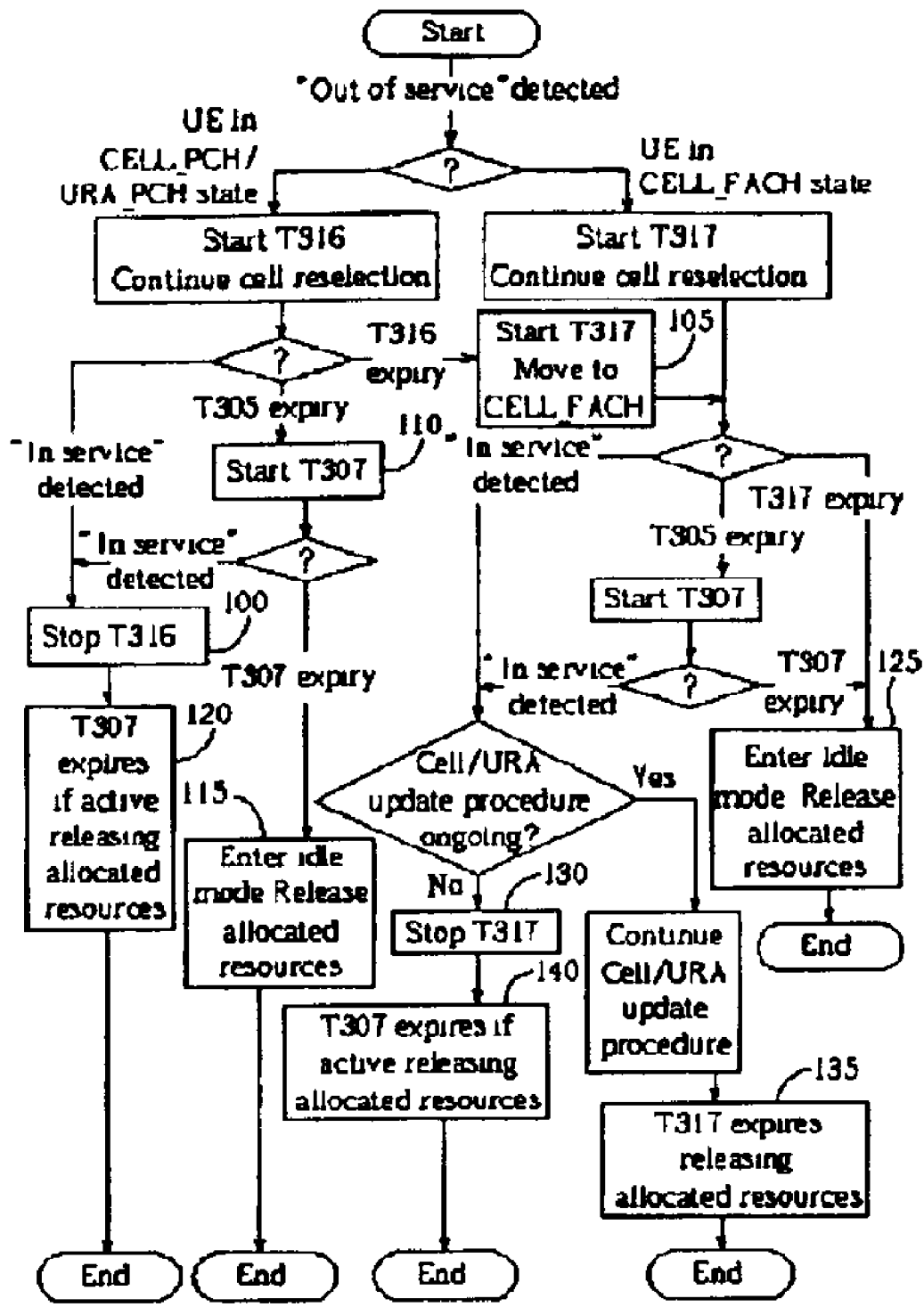
FIG. 4 is a flow chart showing different timers used when a mobile unit of FIG. 1 detects "Out of Service".
Figure 5:
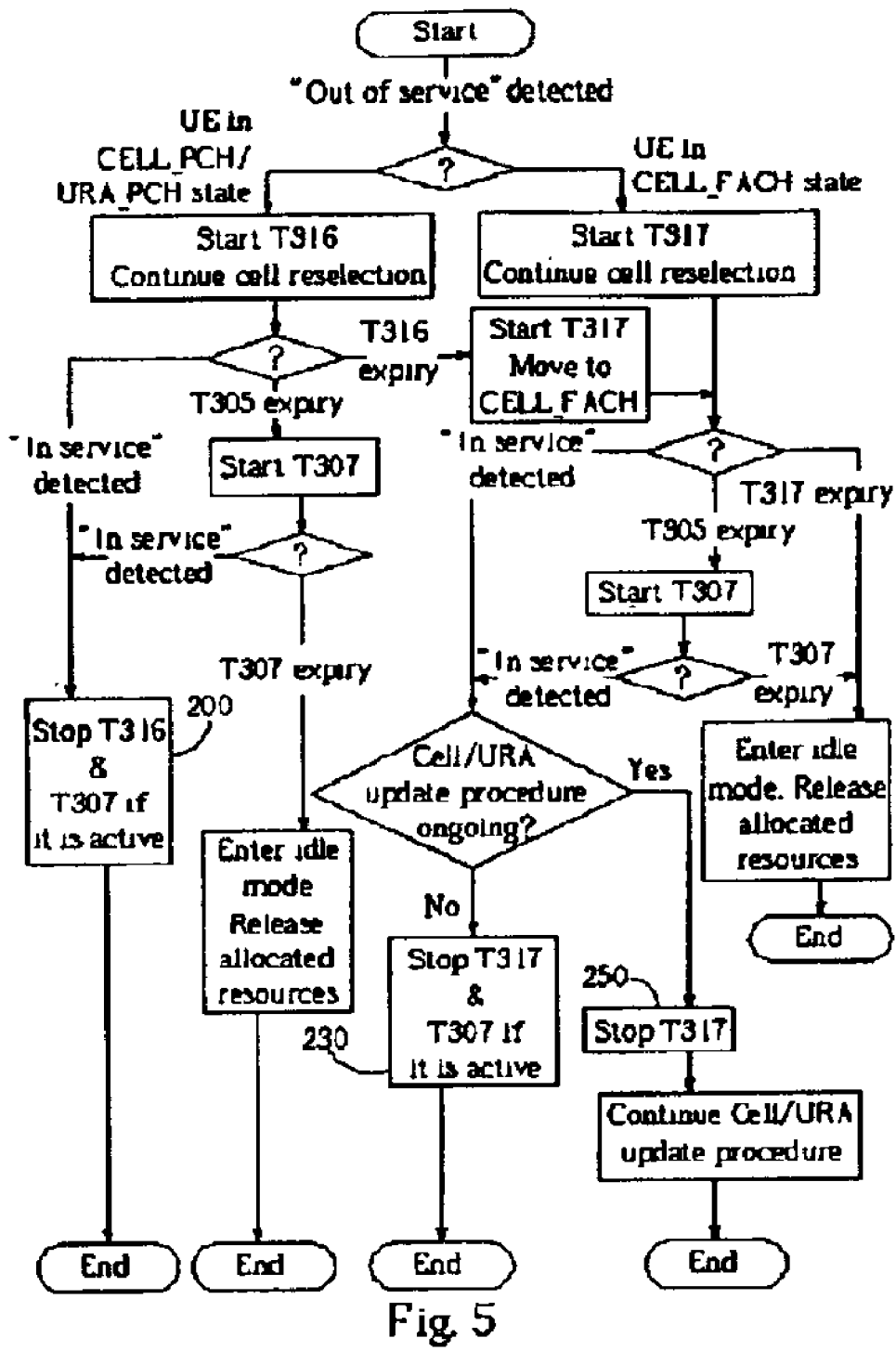
FIG. 5 is a flow chart showing different timers used when a mobile unit detects "Out of Service" according to the present invention.

Please review FIGS. 1–4 when referring to FIG. 5. FIG. 5 is a flow chart of the handling of the UE 40 re-entering a 3GPP service area. The chart begins when the Radio Resource Control (RRC) 80 supported by the UE 40 detects that an "Out of Service" condition exists and the UE 40 is out of normal radio contact with the base station of the wireless communications network. The RRC 80 comprises a plurality of timers for various timing operations. The duration for each timer is set in the IE "UE Timers and constants in connected mode" and is included in the System Information Block type 1 broadcast by the UTRAN 20u.

A first situation at which the present embodiment is directed occurs when the UE 40 is "Out of Service" while in the CELL_PCH state 84 or the URA_PCH state 85. The CELL_PCH state 84 indicates that the UE 40 is known to the base station on a cell level and the URA_PCH state 85 indicates that the UE 40 is known to the base station on a URA level. Both the CELL_PCH state 84 and the URA_PCH state 85 have no dedicated physical channel existing between the mobile unit and the base station and no uplink activity is possible for the mobile unit.

While in the first situation, a first timer T305 may expire, indicating a need for performing a periodical Cell Update procedure. The Cell Update procedure is used by the UE 40 to indicate a change of cell location (i.e., Node B 24), of URA, or connection state 82, 83, 84, and 85. Because the RRC 80 indicates that the mobile unit is currently "Out of Service", a second timer T307 is started to limit the duration of time that the RRC 80 attempts cell reselection and to re-establish normal connectivity with the base station, i.e., to move back into an "In Service" area. If the second timer T307 expires, the RRC 80 releases allocated resources (such as the previously-established radio bearer) and enters the Idle Mode 81, breaking the connection, obviously an undesirable result if the RRC 80 has detected that the UE 40 is within an "In Service" area before the second timer T307 expires.

Therefore in the first situation, once the second timer T307 becomes active, if the RRC 80 detects an in service condition before the second timer T307 expires, the embodiment stops the second timer T307 (FIG. 5, item 200) to avoid mistakenly breaking the connection when the timer T307 eventually does expire.

A second situation at which the present embodiment is directed occurs when the UE 40 is "Out of Service" while in the CELL_FACH state 83. In the CELL_FACH state 83 no dedicated channel is allocated to the UE 40, but instead the UE 40 is assigned a default common or shared transport channel for uplink and downlink.

While in the second situation, again, a first timer T305 may expire indicating a need for performing a periodical Cell Update procedure. Because the RRC 80 indicates that the mobile unit is currently "Out of Service", a second timer T307 is started to limit the duration of time that the RRC 80 attempts cell reselection. If the second timer T307 expires, the RRC 80 releases allocated resources (such as the radio bearer) and enters the Idle Mode 81, breaking the connection, again an obviously undesirable result if the RRC 80 detects an "In Service" condition before the second timer T307 expires.

If the RRC 80 re-enters the "In Service" condition, there remains two possibilities depending on whether a Cell update procedure or a URA update procedure is ongoing. According to the current specification, whenever a cell update procedure or a URA update procedure is initiated, the timer T305 will be stopped. So the timer T307 can only be active if there is no cell update procedure or URA update procedure ongoing. However, by the specification, if neither a Cell Update procedure nor a URA Update procedure is ongoing, the second timer T307 is not stopped and will eventually expire, causing the RRC 80 to release the allocated radio bearer, resulting in an unintentionally severed connection.

Therefore in the second situation, once the second timer T307 becomes active, if the RRC 80 detects an "In Service" condition before the second timer T307 expires, the embodiment stops the second timer T307 when no Cell Update procedure or URA Update procedure is ongoing (FIG. 5, item 230) to avoid inadvertently breaking the connection when the timer T307 eventually does expire.

A third situation at which the present embodiment is directed occurs again when the UE 40 is "Out of Service" while in the CELL_FACH state 83. While in the third situation, a third timer T317 is started for limiting the duration of time that the RRC 80 will attempt to find a suitable cell enabling the RRC 80 to re-enter the "In Service" condition before the RRC 80 releases allocated resources and moves to the Idle Mode 81, severing the connection.

If the RRC 80 is again "In Service" before the third timer T317 expires, the current specification calls for stopping the third timer T317 only when no Cell Update procedure nor URA Update procedure is ongoing.

Therefore in the third situation, once the second timer T307 becomes active, if the RRC 80 detects an "In Service" condition before the third timer T317 expires, the embodiment stops the second timer T307 when a Cell Update procedure or a URA Update procedure (or both) is ongoing (FIG. 5, item 250) to avoid inadvertently breaking the connection when the timer T317 eventually does expire.

In contrast to the prior art, the present invention provides an improved method of handling the re-entry of a UE into a service area of a base station in a wireless communications system. In the prior art, the second timer T307 and the third timer T317, both able to cause the RRC 80 to break the connection between the UE 40 and the base station, were not always stopped when the RRC 80 re-enters an "In Service" condition from an "Out of Service" condition. The present invention stops the second timer T307 and the third timer T317 in these described situations. The inadvertent release of allocated radio bearers by the RRC 80 caused by failure to stop internal timers and the severing of connection between the mobile unit and the base station as a result of the release is avoided in the present invention.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for maintaining connectivity between a mobile unit and a base station in a wireless communications system, the mobile unit comprising a Radio Resource Control (RRC) used to establish at least a radio bearer when the mobile unit is within a service area of the base station and capable of releasing the radio bearer, the RRC comprising a plurality of internal states, each state defining a connective relationship between the RRC and the base station, the method comprising:

starting a second timer as the result of the expiration of a first timer when the RRC is in a CELL_PCH state or a URA_PCH state and when the RRC detects an out of service condition of an established radio bearer;

detecting an in service condition of the radio bearer before expiration of the second timer; and stopping the second timer to prevent expiry of the second timer so as to prevent releasing of the radio bearer;

wherein the CELL_PCH state and the URA_PCH state both have no dedicated physical channel between the mobile unit and the base station, and no uplink activity is possible for the mobile unit.

2. The method of claim 1, wherein the first timer is used to indicate timing of a periodical Cell Update procedure.

3. The method of claim 1, wherein the second timer is used to limit a duration used by the RRC to detect an in service condition of the radio bearer before the RRC releases the radio bearer and enters an Idle Mode.

4. The method of claim 1, further comprising:

starting the second timer as the result of the expiration of the first timer when the RRC is in a CELL_FACH state and when the RRC detects an out of service condition of an established radio bearer detecting the in service condition of the radio bearer before expiration of the second timer; and stopping the second timer if a Cell Update procedure is not ongoing and a URA Update procedure is not ongoing.

5. The method of claim 1, further comprising:

starting a third timer used for limiting a duration used by the RRC to detect an in service condition of the radio bearer before the RRC releases allocated resources and enters an Idle Mode; and stopping the third timer when the in service condition of the radio bearer is detected before expiration of the third timer if a Cell Update procedure or a URA Update procedure is ongoing.

6. A method fur maintaining connectivity between a mobile unit and a base station in a wireless communications system, the mobile unit comprising a Radio Resource Control (RRC) used to establish at least a radio bearer and capable of releasing the radio bearer, the RRC comprising a plurality of internal states, each state defining a connective relationship between the RRC and the base station, the method comprising steps in the following order:

the RRC entering a CELL_FACH state in which the mobile unit is known to the base station on a cell level, no dedicated channel is allocated to the mobile unit, and the mobile unit is assigned a default common or shared transport channel for uplink and downlink;

the RRC detecting an out of service condition of an established radio bearer while in the CELL_FACH state;

starting a second timer as the result of the expiration of a first timer, the first timer being used to indicate timing of a periodical Cell Update procedure, the second timer being used to limit the duration to detect an in service condition of the radio bearer before the RRC releases the radio bearer and enters an Idle Mode;

detecting the in service condition of the radio bearer before expiration of the second timer; and stopping the second timer if a Cell Update procedure is not ongoing and a URA Update procedure is Dot ongoing.

7. A method for maintaining connectivity between a mobile unit and a base station in a wireless communications system, the mobile unit comprising a Radio Resource Control (RRC) used to establish at least a radio bearer when the mobile unit is within a service area of the base station and capable of releasing the radio bearer, the RRC comprising a plurality of internal states, each state defining a connective relationship between the RRC and the base station, the method comprising steps in the following order:

entering a CELL_FACH state in which the mobile unit is known to the base station on a cell level, no dedicated channel is allocated to the mobile unit, and the mobile unit is assigned a default common or shared transport channel for uplink;

the RRC detecting an out of service condition of an established radio bearer while in the CELL_FACH state;

starting a third timer used for limiting a duration used by the RRC to detect an in service condition of the radio bearer before the RRC releases allocated resources and enters an Idle Mode;

detecting the in service condition of the radio bearer before expiration of the third timer; and stopping the third timer if a Cell Update procedure is ongoing, or stopping the third timer if a URA Update procedure is ongoing.

* * * * *